United States Patent
Kopplin

(10) Patent No.: US 7,916,691 B2
(45) Date of Patent: Mar. 29, 2011

(54) ARRANGEMENT AND METHOD RELATING TO SERVICE PROVISIONING CONTROL

(75) Inventor: Dirk Kopplin, Ytterby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 861 days.

(21) Appl. No.: 11/576,779

(22) PCT Filed: Oct. 5, 2004

(86) PCT No.: PCT/EP2004/011110
§ 371 (c)(1),
(2), (4) Date: Sep. 18, 2007

(87) PCT Pub. No.: WO2006/037361
PCT Pub. Date: Apr. 13, 2006

(65) Prior Publication Data
US 2008/0013470 A1 Jan. 17, 2008

(51) Int. Cl.
*H04W 4/00* (2009.01)
*H04W 72/00* (2009.01)

(52) U.S. Cl. ............. 370/329; 370/332; 455/432.1; 455/432.3; 455/452.2

(58) Field of Classification Search .......... 370/329, 370/332, 333; 455/432.1, 432.3, 433, 452.1, 455/452.2
See application file for complete search history.

(56) References Cited

U.S. PATENT DOCUMENTS

| | | | |
|---|---|---|---|
| 7,010,305 B2 * | 3/2006 | Immonen et al. | 455/452.2 |
| 2002/0132611 A1 | 9/2002 | Jouppi | |
| 2002/0160811 A1 | 10/2002 | Zhu | |

FOREIGN PATENT DOCUMENTS

| EP | 0888025 A | 12/1998 |
|---|---|---|
| EP | 1303156 A | 4/2003 |
| WO | WO 0165779 A | 9/2001 |

* cited by examiner

*Primary Examiner* — Un C Cho
(74) *Attorney, Agent, or Firm* — Roger S. Burleigh

(57) ABSTRACT

The present invention relates to an arrangement, in a communication network system supporting communication of packet data. It comprises/has access to mobile subscriber data and comprises means for handling subscriber identity information. It further comprises service level control means ($6_1$, $6_2$; 6) for allocating service level profiles, e.g. QoS profiles, to subscribers. Said services level control means ($6_1$, $6_2$; 6) comprises profile configuration means, for defining network service level profiles (7) and linking subscriber identity information entities to said network service profiles defining the highest allowed service levels at least for a number of different parameters at least for groups of subscribers identified by said subscriber identity information entities. It optionally comprises first validation means (8A) for validating the service level (profiles) requested by subscribers against operator defined subscriber profiles for said subscribers, and at least second validation means (8B) for validating (validated) subscriber profiles against corresponding defined network service profiles for the requesting subscribers as given by the subscriber identity information entities, such that the resource and/or service level profile allocated to a requesting subscriber ($1_1$; 1) can be controlled.

16 Claims, 9 Drawing Sheets

| IMSI NUMBER SERIES | HIGHEST ALLOWED PARAMETER VALUES |
|---|---|
| (MCC+MNC) 1 | ALLOCATION/RETENTION: (VALUE)<br>TRAFFIC CLASS: (VALUE)<br>DELIVERY ORDER: (VALUE)<br>DELIVERY OF ERRONEOUS SDU: (VALUE)<br>MAXIMUM SDU SIZE: (VALUE)<br>MAXIMUM BIT RATE FOR UL: (VALUE)<br>MAXIMUM BIT RATE FOR DL: (VALUE)<br>RESIDUAL BER: (VALUE)<br>SDU ERROR RATIO: (VALUE)<br>TRANSFER DELAY: (VALUE)<br>TRAFFIC HANDLING PRIORITY: (VALUE)<br>GUARANTEED BIT RATE FOR UL: (VALUE)<br>GUARANTEED BIT RATE FOR DL: (VALUE) |
| (MCC+MNC) 2 | |

*Fig. 4*

| ID INFO ENTITIES (ID NUMBER) | ADDITIONAL PARAMETERS | | NETWORK SERVICE LEVEL (QoS) PROFILE (PARAMETERS A-Z) |
|---|---|---|---|
| | $APN_i$; $i = 1,...,y$ | TIME<br>TIME OF DAY $j=1,...,24$<br>DAY OF WEEK $K=1-7$ | |
| $(MCC+MNC)_1$ | $APN_7$<br><br>$APN_5$ | $\begin{cases} 7\text{-}17 \\ 1\text{-}5 \end{cases}$<br>$\begin{cases} 18\text{-}7 \\ 6\text{-}7 \end{cases}$ | $QoS_1$<br><br>$QoS_5$ |
| $(MCC+MNC)_2$<br>\|<br>\|<br>$(MCC+MNC)_X$ | | | $QoS_2$<br><br>$QoS_X$ |

*Fig. 5*

ARRANGEMENT AND METHOD RELATING TO SERVICE PROVISIONING CONTROL

FIELD OF THE INVENTION

The present invention relates to an arrangement, in a communication network system supporting communication of packet data, which comprises or has access to mobile subscriber data and comprises means for handling subscriber identity information, for allocating resource and/or service levels, such as QoS, to subscribers. The invention also relates to a method for controlling the allocation of resource and/or service level to subscribers, i.e. mobile user stations, in a communication network system supporting communication of packet data.

STATE OF THE ART

In networks supporting communication of packet data, more and more packet based services are offered to subscribers. However, in some networks or in parts of networks the available forwarding resources may be limited as compared to other networks or parts of networks. The forwarding resources and other quality factors may also be more or less hardly loaded for example at different times during the day, during the days of a week etc. Bottlenecks may also be produced depending on the usage of network resources etc. Particularly real time services often require at least a given QoS (Quality of Service) in order to allow for delivery with an acceptable quality. In today known systems all subscribers, visiting subscribers as well as own subscribers, i.e. subscribers having the operator of a network to which they are attached as their own operator, are restricted by the network capabilities and the current load as far as the allocation, i.e. provisioning or offering of resources and/or service level is concerned.

This means that users or subscribers, independently of their origin or of which is their home operator, will be given the same probabilities for usage of network resources or granting of a particular QoS. This means that for example visiting users are allowed to request the same QoS as they have in their home PLMN (Public Land Mobile Network) and also have the same probability of being offered resources or QoS as the own subscribers of the network which they are roaming into. This means that each subscriber roaming in from other networks is allowed to request the same QoS as in the home PLMN. However, particularly with the introduction of new packet based services, operators might want to differentiate between subscribers as far as service level provisioning or QoS is concerned. For instance they may be interested in assuring a constantly high, or an as high as possible, service level (QoS) to their own subscribers under varying conditions. They may also want to differentiate between subscribers from different operators. A subscriber may also need to, or want to, e.g. through paying higher charges, be given the possibility of being granted the highest available QoS in any network into which he may roam. However, as of today, there are no possibilities to differentiate appropriately between home users and/or home and visiting users and/or visiting subscribers in terms of network resource usage. There is also no possibility to handle such situations in a so called shared network environment in which operators share the entire networks or only the radio network parts of the networks.

SUMMARY OF THE INVENTION

What is needed is therefore an arrangement as initially referred to through which it becomes possible to differentiate between subscribers. Particularly an arrangement is needed through which it becomes possible to differentiate between subscribers on service level or service level profile, particularly on QoS profile or QoS parameters. Even more particularly an arrangement is needed through which it gets possible to grant or allocate different QoS parameters, such as for example provide for different priorities, for different subscribers. Most particularly an arrangement is needed through which it gets possible to differentiate between subscribers which are roaming, i.e. visiting users, and/or visiting users and home users, or subscribers in terms of network resource usage or assigned service level profile or particularly QoS profile.

An arrangement is also needed through which it gets possible to actively control the service level or QoS allocated or given to an operator's own subscribers, and in particular to visiting users, i.e. subscribers of other operators, or both, or to subscribers in a shared network environment. Most particularly an arrangement is needed through which QoS parameters allocated or granted to visiting users, users in a shared network environment, can be controlled, whereby such parameters may include bit rates and priorities used under normal conditions and/or during situations of congestion, and/or during malfunctioning of entities or nodes etc. Further an arrangement is needed which allows implementation of bit rate restrictions for visiting users or users from specific PLMNs, or particularly generally for PLMNs differentiations, i.e. differentiation depending on PLMN or network of a subscriber. An arrangement is also needed through which it gets possible to conclude roaming agreements with various conditions depending on subscriber and/or operator or for shared networks with various conditions. Most particularly an arrangement is needed which allows dynamic control of service or resource provisioning under different circumstances.

A method as initially referred to is therefore also needed through which one or more of the above mentioned objects can be met.

Therefore an arrangement as initially referred to is provided which comprises resource and/or service level control means for allocating resource and/or service level profiles, e.g. QoS profiles, to subscribers. Said resource and/or service level control means comprises profile configuration means for defining network service level profiles and for linking subscriber identity information entities to said network service level profiles defining the highest allowed resource and/or service levels at least for a number of different parameters, at least for groups or series of subscribers identified by said subscriber identity information entities. It particularly comprises first validation means for validating the service levels or service level profiles requested by subscribers against operator defined subscriber profiles for said subscribers. It should be clear that such first validation means are not necessary for the functioning of the invention; the core of the invention being the second validation means and their functioning. Often, however, a first validation is performed. If so, said first and second validation means may be separate or common means. Second validation means are provided for validating subscriber profiles (which e.g. are validated as discussed above) against the corresponding defined network service level profiles for the requesting subscribers or the groups the requesting subscribers belong to as given by the subscriber identity information entities, such that the resource and/or service level profile allocated to a requesting subscriber can be controlled, particularly independently of whether the subscriber is a visiting or roaming subscriber or a home subscriber or a subscriber in a shared network environment. Different embodiments are possible, for example the inventive concept covers embodiments in which the above only is applicable for the own subscribers or for home subscribers or only for visiting subscribers or for visiting and/or home subscribers and/or subscribers in a shared network environment.

The subscriber identity information particularly comprises the International Mobile Subscriber Identities, IMSI and, even more particularly, said subscriber identity information entities comprise a code identifying the country with which the subscriber is registered, and a code identifying the operator of the subscriber, for example Mobile Country Code information (MCC) and Mobile Network Code (MNC).

In a preferred implementation the network service profiles comprise the highest allowed QoS profiles for the respective subscribers and/or subscriber groups as identified by means of said subscriber identity information entities, i.e. on per IMSI number series basis. In a most advantageous implementation the resource and/or service level control means further comprises means for linking the highest QoS profiles, or more generally service level profiles, for subscribers or groups of subscribers, to one or more additional parameters, each of which parameters being defined for a number of different values. Said additional parameters may for example comprise one or more of a time indication, e.g. the indication as to the time of the day and/or the day of the week or the season or any other indication related to time, an Access Point Name (APN) indication etc.

In one particular embodiment the configuration means further provides a default QoS profile or service level profile to be used for subscribers and/or groups of subscribers for which no network service profile, particularly for which no QoS profile is defined.

Advantageously the network service level profiles, particularly the network QoS profiles, are defined independently of any other service level profiles or QoS profiles, particularly independently of any subscribed QoS profiles, i.e. QoS profiles to which subscribers subscribe.

Particularly the network service profiles, e.g. QoS profiles which even more particularly may be extended by additional parameter values as referred to above, are allocated to home network (operator) subscribers, visiting or roaming subscribers and/or subscribers in a shared network environment. In one embodiment the network service profiles are defined on a per operator basis such that a differentiation can be made depending on operator. According to an advantageous implementation the network service profiles comprise network QoS profiles defining highest allowed values of QoS parameters, such as for example one or more of traffic class, delivery order, maximum bit rate for uplink/downlink, maximum Service Data Unit (SDU) size, delivery of erroneous SDUs, residual Bit Error Rate (BER), SDU error rate, transfer delay, traffic handling priority, guaranteed bit rate for uplink/downlink etc.

In an advantageous embodiment the arrangement is provided in or comprises a packet data node. Even more particularly the packet data node comprises an SGSN (Serving GPRS Support Node) or a GGSN (Gateway GPRS Support Node) or a CGSN (Combined GPRS Support Node) or any other nodes with a similar functionality.

Particularly said second validation means comprises comparing means for comparing the requested or subscribed service level profile or QoS profile of a subscriber, or the group to which a subscriber belongs as defined through the subscriber identity information entities, with the network service level profile or network QoS profile, for that user (groups), and if the requested QoS profile or certain parameter values thereof exceed the corresponding parameter values of the network service level profile or network QoS profile, the requested service level or QoS profile is downgraded, at least as far as the exceeded parameter values are concerned, thus giving a granted or allocated service level profile.

For validation by the first validation means, subscriber data is fetched from a HLR (Home Location Register) in case the requesting subscriber is a home network subscriber, or from a VLR (Visiting Location Register) if the requesting subscriber is a visiting or roaming subscriber.

The network service profiles are particularly defined for an entire network or alternatively for one or more parts of the network, or for an entire shared network or for parts of a shared network, whereby the shared network may comprise a completely shared network or a network in which only the radio access networks are shared.

Particularly the arrangement comprises or is comprised by an SGSN or some other node with a similar functionality and a validation is performed by said first and second validation means at reception of an activate PDP context request from a subscriber, i.e. a mobile user station MS, a user equipment UE, and/or at reception of a create/update PDP context response from a GGSN and/or at reception of a radio access bearer assignment response from the radio network over which the subscriber has attached or is connected, i.e. a node thereof, for example an RNC, Radio Network Controller or a BSC, Base Station Controller. Hence the validation procedure may be performed at the occurrence of different activating events or in other embodiments a validation is only performed at occurrence of a particular event, for example at reception of an activate PDP context request from a subscriber.

In another embodiment the arrangement comprises or is comprised by a GGSN or a node with a similar functionality, and a validation is performed by said first and second validation means at reception of a create or an update PDP context request from an SGSN. Still further the node may comprise a CGSN, i.e. the arrangement may comprise or be comprised in a CGSN which is a packet data node with a combined functionality of an SGSN and a GGSN and a validation may then be performed by said first and second validation means either at reception of an activate PDP context request from a subscriber or at reception of a radio access bearer assignment response from the radio access network over which the subscriber is attached or at occurrence of both these events.

In a particularly advantageous implementation the service level profiles are configured or updated dynamically in dependence of the prevailing conditions in the network and in the radio network, for example as far as availability of forwarding resources is concerned, for example due to a heavy load on some resource or resources or due to a congestion or any other situation or due to malfunctioning nodes or links etc. In an alternative embodiment the network service level profiles can be said to be static although, also in such a case they may of course be reconfigured more or less regularly or at the occurrence of certain events, congestions etc, automatically or "manually".

A method as initially referred to is therefore also provided which comprises the steps of: creating or configuring network service level profiles in an arrangement or a node in the network by defining the highest allowed service levels or a service level profiles for a number of subscribers or a number of groups of subscribers identified by means of mobile subscriber identity information entities, and, at an activating event, in a node in the network to which a subscriber has connected/attached: particularly validating a service level profile request, e.g. a QoS profile request requested by the user, against a subscriber service profile as defined by the operator of the subscriber (it should be clear that this step is not indispensable; i.e. it may be performed or not according to different implementations, as also discussed earlier in this application); fetching the created or configured network service (or QoS) level profile applicable for the requesting subscriber based on the mobile subscriber identity information entities; validating the validated requested or subscriber service profile against the network service profile for the subscriber by comparing said subscriber service profile with said subscriber network service profile, whereby, if the network service level profile or any part thereof, i.e. the values on the parameters is/are lower than the validated requested subscriber service profile parameter values, downgrading the requested service level profile, at least in these parts i.e. for these values, such that the allocated or granted service level profile does not exceed said network service level profile (i.e. such that the parameter values of the granted service level profile do not exceed the corresponding network service level parameter values).

Particularly the method comprises the step of, if there is no network service level profile defined for a given requesting user or a group to which he belongs as given by the information entities, rejecting requests from such users or granting a default service level profile to such users. As referred to above the subscriber identity information entities may comprise mobile country code information such as MCC and mobile network code information such as MNC of the subscriber/IMSI.

Most particularly the configuring step comprises defining the highest allowable QoS profiles for subscribers and/or subscriber groups as identified by means of said subscriber identity information entities. Even more particularly the defining step included in said configuring step comprises a step of linking the highest QoS profiles for subscribers or groups of subscribers to one or more additional parameters, each defined to assume a number of different values, whereby said additional parameters for example may comprise one or more of a time indication e.g. a time of day and/or day of week, season, date, APN indication etc. such that for subscribers or groups of subscribers, e.g. based on IMSI number series, as referred to above, the values depending on time of day or day of week etc. This means for example that subscribers e.g. of a particular operator may be offered a particular service level profile (or QoS profile) for the night and weekends and another during office hours etc. Any variation is in principle possible and it gives the operator free hands to flexibly control which QoS or service level to be offered to which subscribers or groups of subscribers, under which circumstances etc.

Particularly the allowed or granted (also denoted allocated) service level profiles are provided to home network subscribers and/or to visiting subscribers and/or to subscribers in a shared network environment.

As referred to above the method may be performed in a packet data node such as an SGSN at the occurrence of one or more different activating events. Alternatively, or additionally, it is performed in a GGSN at the occurrence of an activating event as discussed above, or in a CGSN at the occurrence of different events as also discussed in the foregoing.

The configuring step particularly comprises fetching subscriber data comprising subscribed service level profile or QoS data from a HLR (Home Location Register) or a Visiting Location Register (VLR) for use in the first validation step depending on whether the user is a home user or a visiting user.

The parameters included and given a value in a network service profile may comprise one or more of the traffic class, delivery order, maximum bit rate for uplink/downlink etc. as also discussed earlier with reference to an advantageous implementation of arrangement according to the present invention.

BRIEF DESCRIPTION OF THE DRAWINGS

The invention will in the following be further described in a non-limiting manner, and with reference to the accompanying drawings, in which:

FIG. 4 illustrates one example of an IMSI based parameter database which in one embodiment of the present invention is included in or communicates with an SGSN, FIG. 5 schematically illustrates one example of a network service level or QoS profile table extended with additional controllable parameters.

DETAILED DESCRIPTION OF THE INVENTION

Figure 1:
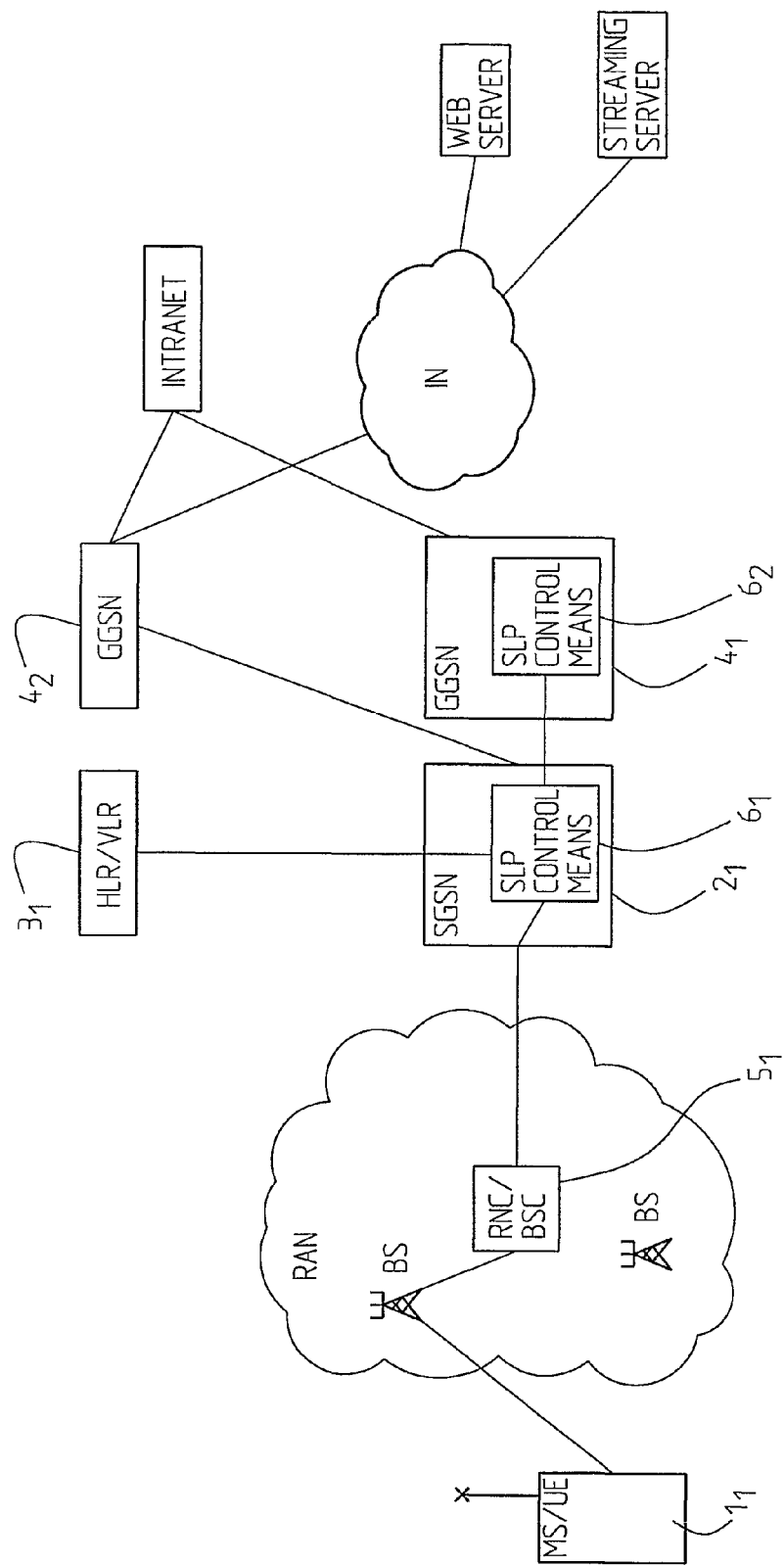
FIG. 1 very schematically illustrates a part of a communication system in which the inventive concept is implemented.

FIG. 1 very schematically shows a communication system in which the inventive concept can be implemented. The communication system supports communication of packet data and it comprises a core network and a number of Radio Access Networks, RAN (only one shown). Each such RAN comprises a number of Base Stations BS which are controlled by Radio Network Control means (RNCs or BSCs) In the Figure an end user station or a user equipment MS/UE $1_1$ is illustrated which here connects to RNC (BSC) $5_1$. Packet data support node functionality in the core network is provided by server packet data nodes and gateway packet data nodes, specifically serving GPRS Support Node SGSN $2_1$ (only one illustrated) and gateway GPRS Support Nodes GGSN $4_1$, $4_2$ in e.g. a UMTS (Universal Mobile Telecommunication Services) or a GPRS (GSM Packet Radio Service) implementation.

Over the GGSNs communication is provided with external data networks, for example Internet IN, intranets, and with e.g. WEB servers, streaming servers or servers in general. It should be clear that the shown system merely is a very simplified example of a system. It may e.g. also be a system with shared networks or various networks with shared RANs, or any other networks. The core network also comprises a number of routers (not shown) on the links of the backbone or core network as well as sites, which may be arranged in any appropriate manner. The connection to external networks can be provided for through one or more gateway packet data nodes.

In the embodiment of FIG. 1 it is supposed that SGSN $2_1$ is provided with service level profile (SLP) control means $6_1$ and, in addition thereto, that also GGSN $4_1$ is provided with SLP control means $6_2$. SLP control means may be provided in SGSNs and/or GGSNs as will be further described below. The service level profiles, particularly the QoS profiles of subscribers form part of the subscriber profiles and they are stored in the Home Location Register (HLR) or in a Visiting Location Register (VLR) as far as roaming users are concerned. So far these profiles have always been used independently of the current location of the subscriber, e.g. in the home PLMN, in a foreign PLMN but also in parts of the network (home or foreign) with the limited forwarding resources which, as discussed above, is disadvantageous With the introduction of new packet based services and through use of the inventive concept operators may offer services and subscriptions by making use of service level profiles or particularly QoS differentiations on allowed bandwidth usage or prioritizations of different kinds in areas with limited forwarding resources, or where it for other reasons is desirable to differentiate. For example real time services often require an acceptable QoS in order to be delivered to the subscriber with an acceptable quality. This can be provided for through the introduction of SLP control means as will be more thoroughly explained below.

Through the introduction of SLP control means $6_1$, $6_2$ (in SGSN and/or GGSN) an operator is enabled to control the service level profiles or specifically QoS profiles allocated or granted to subscribers. An operator may for example give preference to its own subscribers in areas with limited forwarding resources or for access to enhanced data rates such as EDGE (Enhanced Data Rate for Global Evolution) or HSDPA (High Speed Data Packet Access). Thus, through the introduction of the inventive concept operators get a means to control service level profiles allocated to their own users as well as to visiting users and to prioritize differently between subscribers irrespectively of whether the subscribers being the operators own subscribers or subscribers of other networks, or subscribers in a shared network environment.

Subscriber service level profiles, or subscriber data in general, are fetched by SGSN from HLR/VLR $3_1$; it should be clear that it is HLR for the operator's own subscribers whereas it is VLR for visiting subscribers.

It is further known that operators and their subscribers can be identified by analyzing IMSI (International Mobile Subscriber Identity) numbers. The IMSI number consists of a Mobile Country Code, MCC, Mobile Network Code, MNC, and a Mobile Subscriber Identification Number, MSIN, identifying the subscriber and the HLR. The owner of the IMSI number series can be identified by analyzing MNC and MSIN. In an advantageous implementation of the invention a configuration option is provided for mapping service level parameters or particularly QoS parameters to IMSI numbers or IMSI numbers series. This is particularly done in SLP control means in for example an SGSN. It may of course also be done in a CGSN which is a combined GPRS support node including the functionality of an SGSN as well as a GGSN. The service level profile control means may also or alternatively be provided in a GGSN.

Figure 2:
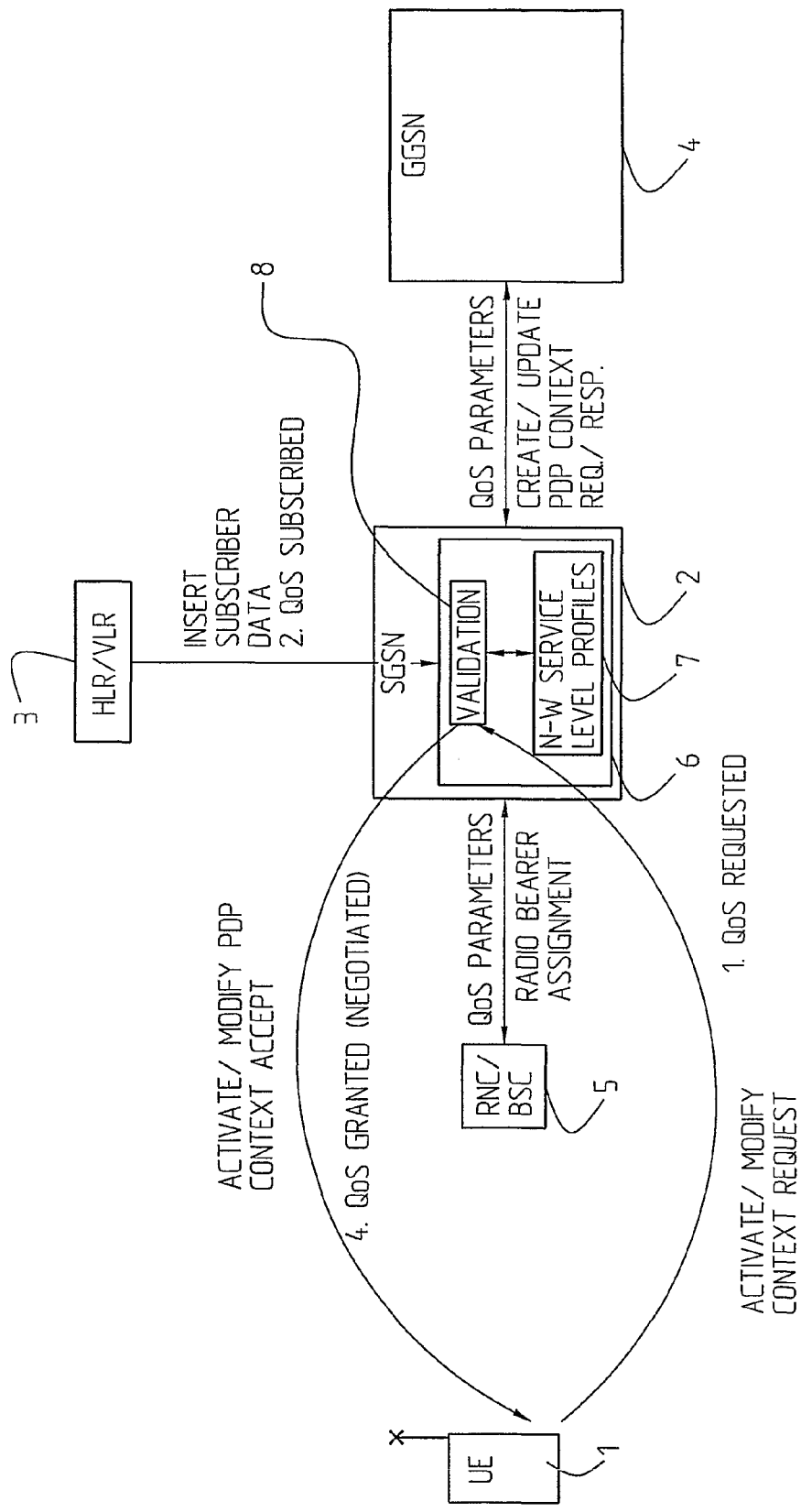
FIG. 2 is a schematical block diagram of a part e.g. of the communication system of FIG. 1 in which a resource and/or service level (SLP) control means is implemented in an SGSN.

In the embodiment illustrated in FIG. 2, it is however supposed that the service level profile control means or SLP functionality is provided in an SGSN 2. It is here supposed that a user equipment UE 1 sends an Activate or Modify PDP Context Request to SGSN 2 in which a particular QoS is requested, (1).

Further a database 7 or similar is provided in SGSN in which network service level profiles or network QoS profiles, particularly mapped to MCC and MNC of IMSI numbers, are stored. As referred to above subscriber data including subscribed, for example QoS, profiles, is stored in HLR or VLR 3 bearing in mind that the subscriber may be a home subscriber or visiting subscriber. Thus, SGSN fetches, for the requesting subscriber of UE 1, the QoS subscribed (2) and first performs a validation of the requested QoS (1) against the QoS subscribed (2) in validation means 8, (3). Subsequently the relevant network service level profile or particularly network QoS profile is fetched from the storing means 7 holding network server level profiles and against which the QoS subscribed (requested) is validated in said validation means 8. The network service level profile comprises the highest allowable service level or QoS for the IMSI number or IMSI number series and a comparison is performed to see if the validated QoS subscribed as far as one or more parameters is/are concerned exceed(s) the corresponding network QoS profile parameter values as defined for (or mapped to) that particular subscriber or the group he belongs to. If the subscribed QoS profile exceeds, (as far as one or more parameters are concerned), the corresponding network service level profile parameter values, the requested QoS or subscribed QoS is downgraded such as to not exceed the network QoS profile for any parameter and such a QoS is granted or allocated, and it is returned to UE 1, for example with an Activate/Modify PDP Context Accept (4). It should be clear that the validation in validation means 8 in SGSN 2 may be performed also at reception of a Create or Update PDP Context Request from GGSN 4. Still further it may be performed at reception of a radio bearer assignment response from an RNC or BSC 5, to which the User Equipment 1 is connected. Here there are three different occasions at which a validation or granting of a service level profile can be performed. In different embodiments it is only performed at reception of an Activate/Modify PDP Context Request from the User Equipment and/or at reception of a Create/Update PDP Context Response from a GGSN and/or at reception of radio bearer assignment response (e.g. a RAB Radio Access Bearer assignment response) from a radio network node. Any variation is in principle possible.

Figure 3:
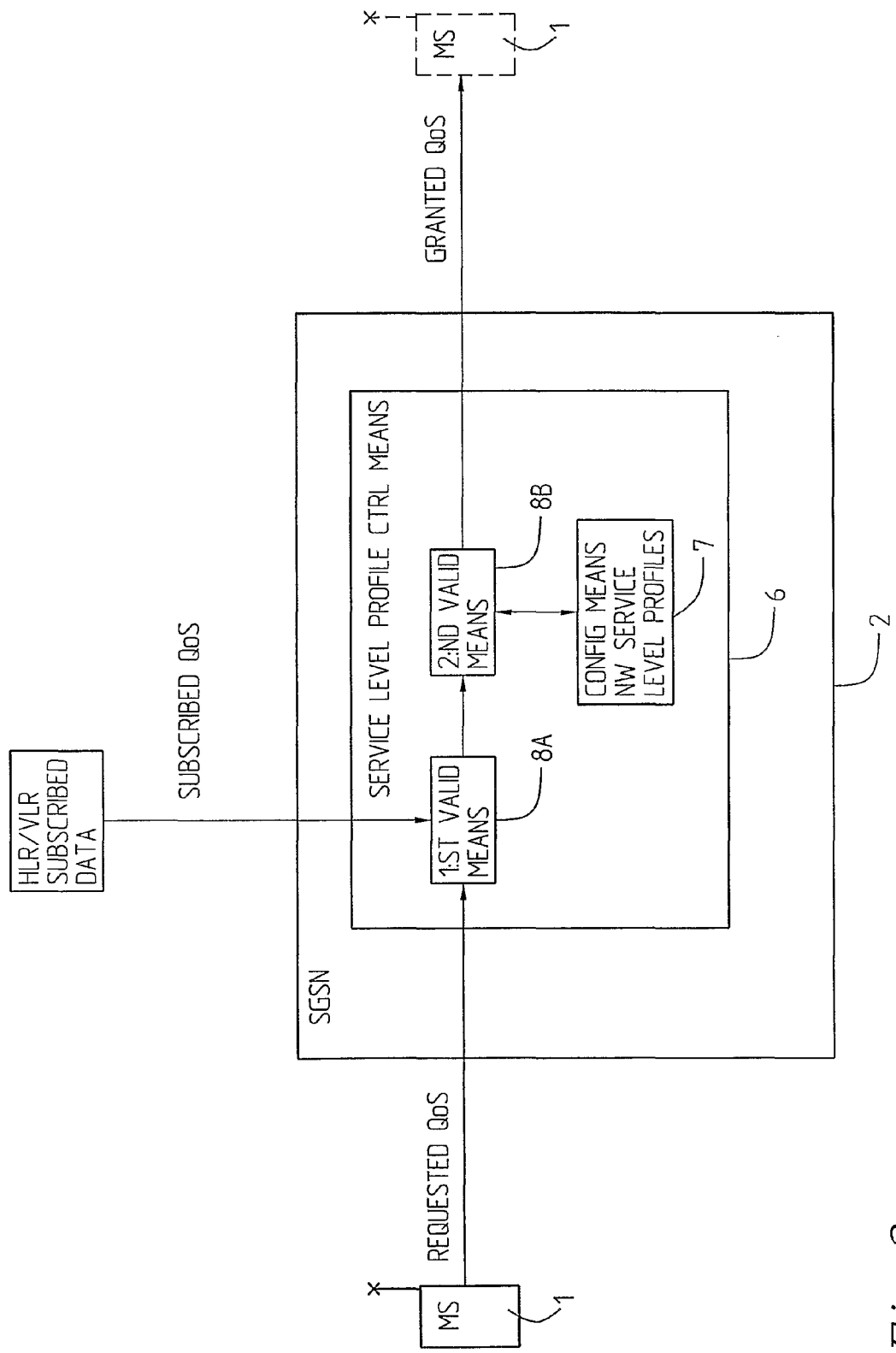
FIG. 3 is a block diagram illustrating a service level control means as implemented in the SGSN of FIG. 2 in a more detailed manner.

FIG. 3 is a block diagram describing the validation procedure in a somewhat more detailed manner in SGSN 2 of FIG. 2.

It is here supposed that an allocation or granting of a service level profile, or more particularly QoS profile, is performed in SGSN 2 at any of the three, with reference to FIG. 2, indicated activation events. However, for reason of simplicity it is supposed that MS 1, (or a User Equipment as referred to above) requests a QoS. As discussed above the service level profile, SLP, control means, comprises configuration means 7 configuring network service level profiles based on identity information entities which particularly comprise MCC and MNC. Thus, for a number of IMSI number series as defined by MCC+MNC, network service level profiles are stored corresponding to the highest allowable service levels for a number of parameters. Particularly they are also further defined by additional parameters as will be further described with reference to FIG. 5.

Hence, when a QoS Request is received in first validation means 8A, subscriber data is fetched from HLR or VLR depending on whether the user is a home subscriber or a visiting subscriber. In said first validation means 8A the requested QoS is validated against the subscribed QoS and the result of said first validation is in a second validation means 8B validated against the, for MS 1 or the group/series defined by MCC and MNC, fetched highest allowable network service level profile, or the network QoS profile. The highest service level profile or highest QoS profile may for example comprise a definition of different QoS parameters such as maximum bandwidth, guaranteed and non-guaranteed and/or highest service class and/or priority attributes etc. of which an example is given in FIG. 4 below. Thus, through the validation mechanism particularly in the second validation means, it is assured that the granted or allocated QoS does not exceed the network QoS profile as far as any parameter of the network QoS profile is concerned. It should be clear that the network QoS profiles are defined independently of any other QoS profiles such as QoS subscribed. Hence, MS 1 is allocated or granted a controlled QoS. It should be clear that the MS 1 illustrated with a dashed line to the right in the figure is the same MS 1 as on the left side of the figure but it is illustrated separately from the MS 1 to the left for reasons of clarity. Since MCC in combination with MNC provides information about which operator the subscriber belongs to, it gets possible for the operator of SGSN 2, which hence may be another operator than the operator of MS 1, to define rules for example for bandwidth, traffic class usage etc. for different subscriber or subscriber groups, or for different operators.

In FIG. 4 an example of a GSN (GPRS Support Node) IMSI parameter database 7 is shown which can be used during the configuration of the network service level profiles. Hence, in this example for $(MCC+MNC)_1$ the highest allowed values are given for for example the parameters Allocation/Retention, Traffic Class, Delivery Order, Delivery of erroneous SDU, Maximum SDU size, Maximum bit rate for UL/DL (Uplink/Downlink), Residual BER, SDU error ratio, Transfer delay, Traffic Handling priority, Guaranteed bit rate for UL/DL and similar for another combination $(MCC+MNC)_2$ etc.

It should be clear that they may have different values for the different IMSI number series but also that for an MS or an $(MCC+MNC)_x$ for which no specific value is given for one or more of the parameters, default value(s) may apply. It should also be clear, that in one embodiment, if there is no network service profile at all given for a particular subscriber or for a particular IMSI number series, a default service level profile or QoS profile may be implemented. Alternatively, in another embodiment, if no network service level profile is provided for a particular IMSI number series or particular subscribers etc., this may be used as an indication that the request shall be rejected.

As referred to above, additional parameters may be used for defining or extending a network service level profile, i.e. rules may apply differently for access to different APNs or different rules may apply for access at different times etc. Thus, in FIG. 5 a table is shown which is used to, for identity information entities or ID numbers or even more particularly IMSI number series as referred to above, provide different service level profiles for different access point names, here $APN_7$ and $APN_5$ at different times of the day. Hence, a network service level profile $QoS_1$ for one or more of parameters A-Z is granted between 7 and 17 from day 1 to day 5 over $APN_7$ whereas $QoS_5$ is granted between 18 to 7 o'clock during day 6 and 7 of the week over $APN_5$ etc. Similarly network service level $QoS_2$ is granted to $(MCC+MNC)_2$ whereas for the remaining identity information entities no additional parameters are given except for the service level profile parameters themselves, hence no additional rules apply for access to certain APNs at defined times etc. It should be clear that the additional parameters can be varied in a number of different ways, values can be given for other additional parameters etc.

Figure 6:
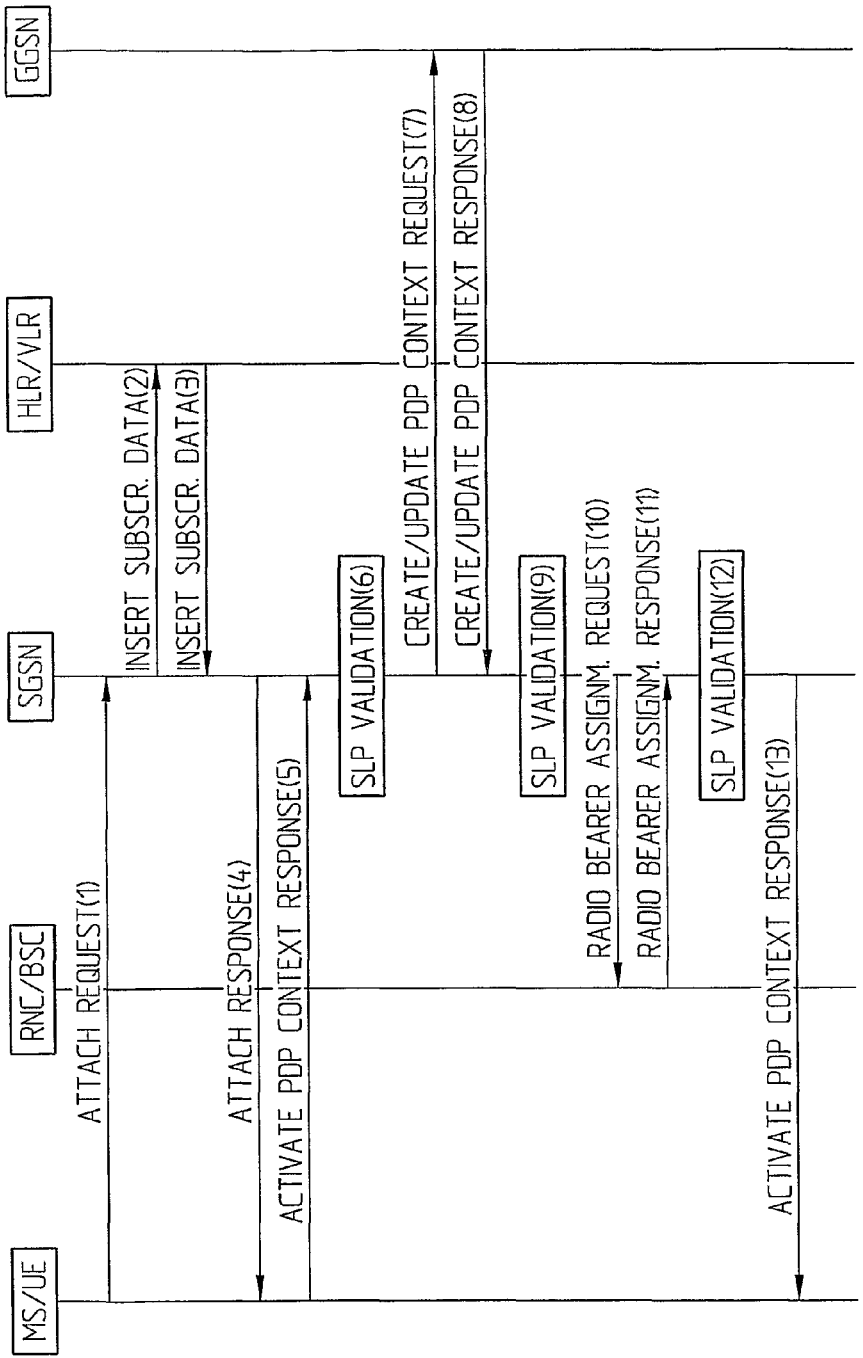
FIG. 6 is a sequence diagram illustrating one example of a sequence for controlling the allocated or granted service level profile when a Service Level Profile (SLP) means is included in an SGSN.

FIG. 6 is a sequence diagram schematically illustrating the procedure according to one implementation of the inventive concept. It is hence supposed that a MS/UE sends an Attach Request (1) to an SGSN. The SGSN then sends a request for insertion of subscriber data (2) to HLR/VLR, which downloads the subscriber record including QoS data to SGSN (3). SGSN then provides an Attach Response to MS/UE (4). Thereupon MS/UE sends an Activate PDP Context Request (5) to SGSN. It should be clear that so far the steps are performed in a conventional manner. However, at this stage an SLP validation (6) as described for example with reference to FIG. 3 may be performed. The result will be a granted service level profile or particularly a QoS profile as more thoroughly described with reference to FIGS. 7 and 8 below. It is then supposed that SGSN sends a Create or Update PDP Context Request (7) (also in a conventional manner) to GGSN which responds with a Create/Update PDP Context Response (8). Also at this stage of the signalling sequence an SLP validation (9) may be performed.

SGSN also requests assignment of radio bearer from the radio network over which the MS/UE has attached, e.g. an RNC or a BSC, and at a response from RNC/BSC (11) an SLP validation (12) may also be performed. Finally an Activate PDP Context Response (13) is provided to MS/UE.

It should be clear that SLP validations (6), (9), (12) may be performed at these different stages or only at step (6) or (9) or (12) or in any combination. The inventive concept functions independently of radio access network technology and it is for example applicable for GPRS radio networks, WCDMA (Wideband Code Division Multiple Access), Wireless LAN (WLAN) etc. FIG. 6 mainly is intended to illustrate when a validation may be performed. It should be clear that here SGSN comprises storing means for storing (after creation or configuration) of network service level profiles as discussed above. However, not illustrated in this figure, an SLP validation may also (or alternatively) be performed in GGSN. In that case it is performed at the reception of a Create/Update PDP Context Request (7) from SGSN and before returning the Create/Update PDP Context Response (8) to SGSN.

The SLP validation will be more thoroughly explained with reference to the flow diagram of FIG. 7.

Figure 7:
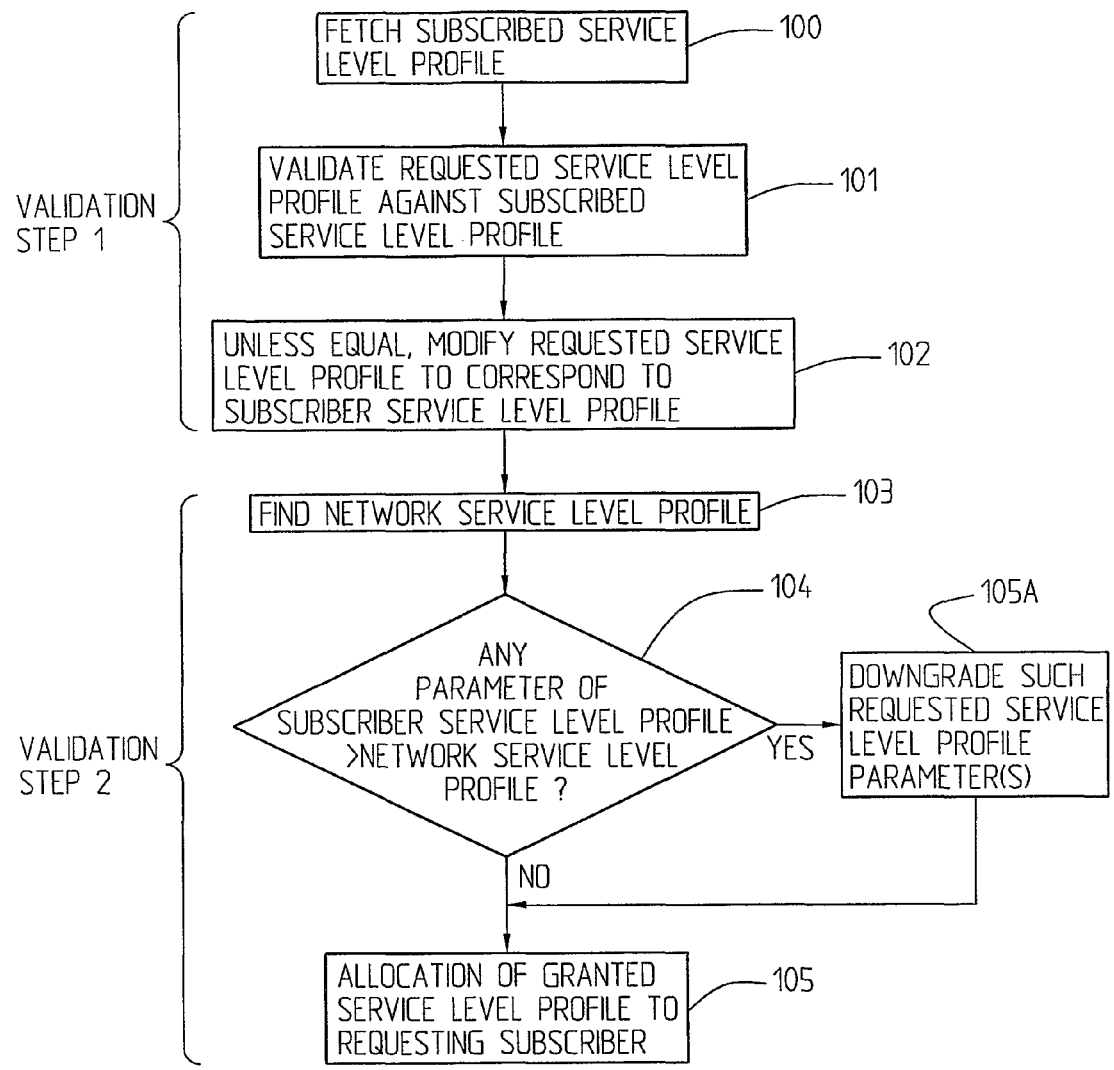
FIG. 7 is a flow diagram schematically illustrating the procedure of SLP validation in SGSN in the embodiment of FIG. 6.

FIG. 7 is a flow diagram schematically describing the SLP validation procedure e.g. according to step (6) in FIG. 6. Hence, it is supposed that at a first validation step the subscribed service level profile is fetched, 100. Subsequently the requested service level profile is validated against the subscribed service level profile, 101. Unless it is equal, the requested service level profile may be modified to correspond to the subscribed service level profile, 102. The procedure is then continued with a second validation step. First the configured network service level profile is found, 103. Then it is examined if any parameter or parameters of the subscribed service level profile have higher values than the corresponding parameters of the network service level profile, 104. If yes, such requested service level profile parameters are downgraded, 104A, and the hence obtained, downgraded, service level profile is granted to the requesting subscriber, 105. If the values of all relevant parameters of the subscribed service level profile are lower than or equal to the corresponding parameters of the network service level profile, such subscribed service level profile is granted to the requesting subscriber, 105.

If there is no network service level profile defined for the requesting subscriber, a default service level profile may be attached. According to different embodiments the network service level profiles are defined for parts of the network or for the entire network. Therethrough it gets, for example, possible to align the network service level profiles with available forwarding resources. Forwarding resources may for example be limited by the used radio technology, for example GPRS, WCDMA, WLAN or CDMA, or the amount of expected simultaneous users (dense areas) or other features. The inventive concept is also applicable in shared networks where either the radio access networks or the entire networks are shared. The suggested solution operates independently of radio access technology.

Figure 8:
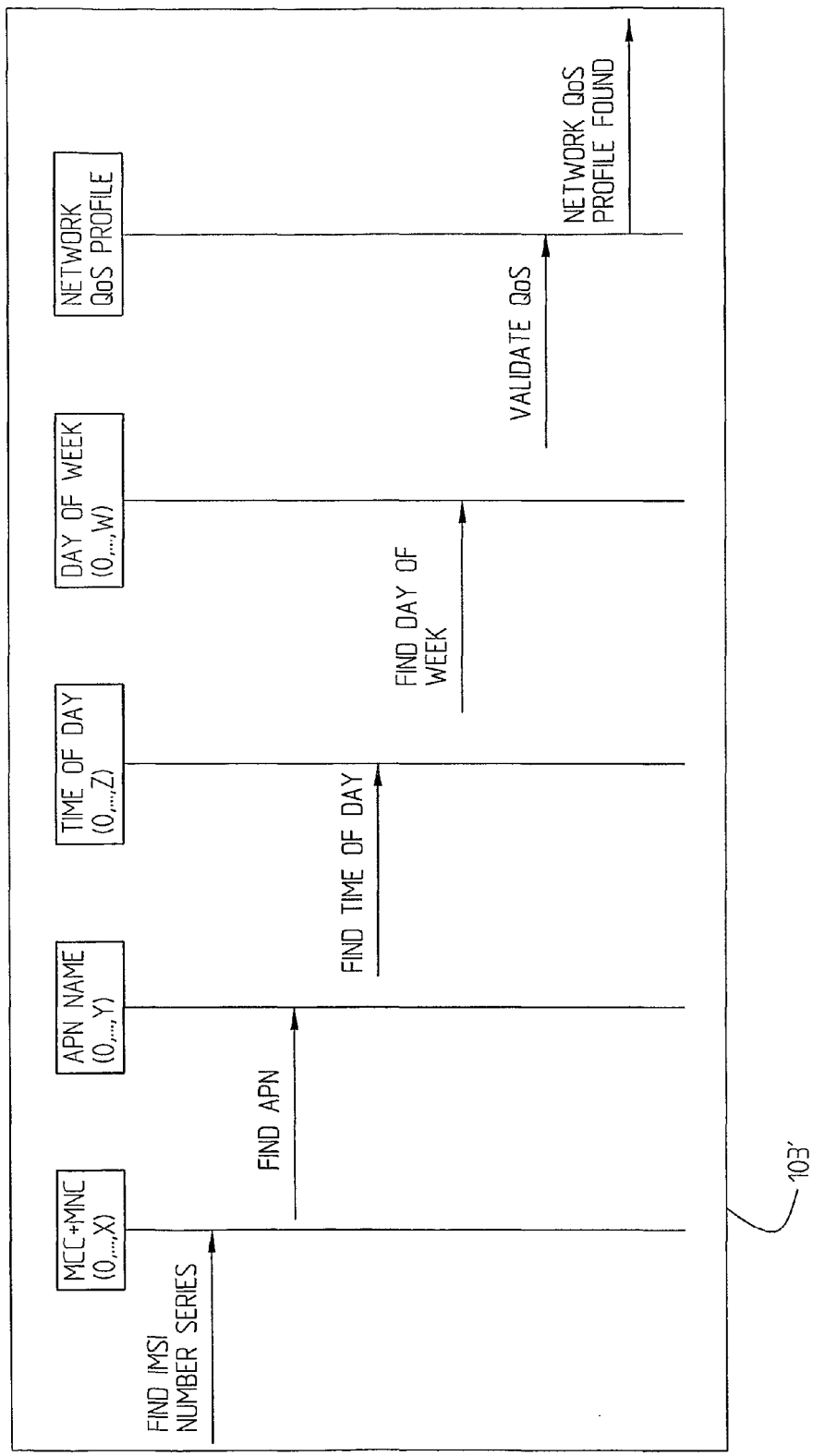
FIG. 8 is a flow chart schematically illustrating an example of how a network QoS profile can be selected in the second validation step of FIG. 7 taking into account values on additional parameters.

In the second SLP validation, or preceding the second validation/an extended validation may also be performed as discussed in FIG. 8 describing a number of optional steps that can be carried out in order to select a network service level profile, particularly network QoS profile, extended with additional parameter restrictions. In this figure the network service level profile is linked to one or more of the options IMSI numbers series, APN name, time of day, day of week etc. However, in this case it is supposed that there are X+1 IMSI number series determined by MCC+MNC, Y+1 APN names, the time of the day divided into Z+1 entities and the days of the week divided into W+1 entities (normally seven), and as referred to above a number of network QoS profiles are stored. Thus, from the subscriber information the IMSI number series is first found by establishment of MCC+MNC. Then, here, it is established if there is an indication about which APN names that are available for that series and if there are any particulars as to time of day, day of week etc. Finally the network QoS profile is validated and found. It is to be understood that also other additional parameters could be used or only some of them, in any combination. The parameter IMSI number series is shown as optional since alternatively some other identifying entities may be used.

Figure 9:
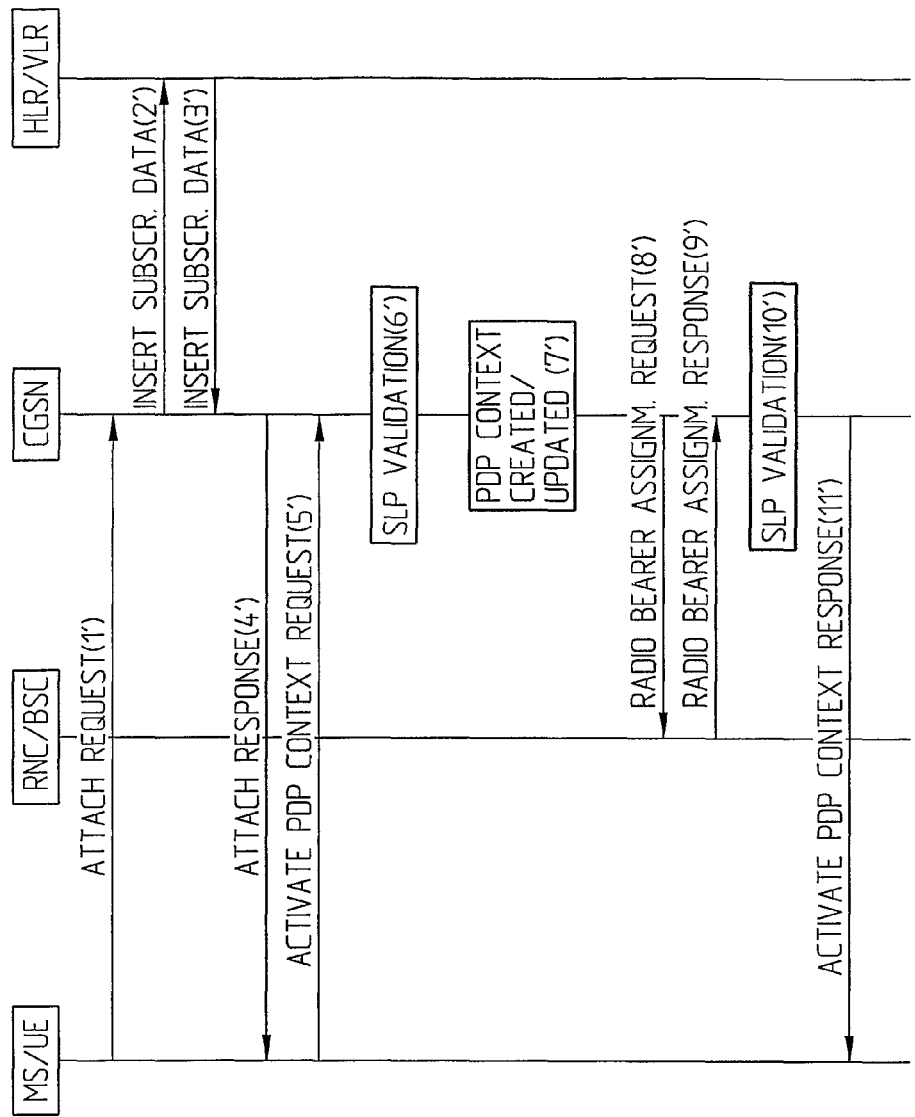
FIG. 9 is a sequence diagram similar to that of FIG. 6 with the difference that a service level profile control means is provided in a CGSN.

Finally FIG. 9 is a sequence diagram similar to that of FIG. 6 but it is here supposed that the SLP validation functionality, i.e. the service level profile control functionality lies in a CGSN. Steps (1-5) of FIG. 6 correspond to steps (1'-5') with the difference that it is a CGSN instead of an SGSN. Then the SLP validation (6') may be performed in a way similar to that of the embodiment in which the arrangement is comprised in or comprises an SGSN. The PDP Context may in this case be created or updated within the CSGN (7'). It is also CGSN that requests a radio bearer assignment from for example RNC or BSC and a validation (10') may be performed after reception of the response from RNC/BSC. Finally it is supposed that an Activate PDP Context Response (5') is returned to MS/UE with the allocated or granted service level profile. Hence the SLP validation may in this case be performed step in (6') and/or in step (7').

It is an advantage of the invention that a tool is provided through which it gets possible to fully control the service level or QoS given to, in addition to home users, also to visiting users or to users in a shared network environment and thus, permit introduction of service level or QoS based roaming restrictions. It also allows the giving of preferences to prioritized subscribers over non-prioritized subscribers in general independently of HLR or subscriber parameters. Particularly the control of service level profile is based on IMSI number series which identify operators. It is also possible to do it based on the other entities contained in IMSI such as only country code or only operator or subscribers individually. Through the invention it gets possible to provide resources to preferred subscribers while at the same time restrict resource usage for other subscribers and the mechanism may particularly operate independently of the origin of the subscribers.

It should be clear that the invention is not limited to the specifically illustrated embodiments, but that it can be varied in a number of ways within the scope of the appended claims.

The invention claimed is:

1. An arrangement in a wireless communication network for allocating Quality of Service (QoS) profiles to mobile subscribers, the arrangement comprising:
   means for receiving from a mobile subscriber, a request for a requested QoS profile;
   means for retrieving from a subscriber profile, a subscribed QoS profile for the requesting mobile subscriber in response to receiving the request;
   means for defining a plurality of groups of subscribers based upon at least one subscriber characteristic, wherein the requesting mobile subscriber is a member of a defined group;
   means for allocating a group QoS profile to each group of subscribers; and
   means, responsive to the request, for allocating to the requesting mobile subscriber, an allowed QoS profile that is the lowest of the subscribed QoS profile, the group QoS profile for the requesting mobile subscriber's defined group, and the requested QoS profile.

2. The arrangement according to claim 1, wherein the requesting mobile subscriber's defined group comprises mobile subscribers for whom the communication network is a home network.

3. The arrangement according to claim 1, wherein the requesting mobile subscriber's defined group comprises mobile subscribers for whom the communication network is a visited network.

4. The arrangement according to claim 1, wherein the requesting mobile subscriber's defined group comprises mobile subscribers who pay higher fees for better QoS.

5. The arrangement according to claim 1, wherein the means for defining a plurality of groups also considers a time and date indication when defining the groups of subscribers.

6. The arrangement according to claim 1, wherein the means for defining a plurality of groups also considers an Access Point Name (APN) when defining the groups of subscribers.

7. The arrangement according to claim 1, wherein the group QoS profiles are defined on a per-operator basis.

8. The arrangement according to claim 1, wherein the group QoS profiles are dynamically updated depending on resource availability in the communication network.

9. A method in a wireless communication network for allocating a Quality of Service (QoS) profile to a requesting mobile subscriber, the method comprising the steps of:
   defining a plurality of groups of subscribers based upon at least one subscriber characteristic, wherein the requesting mobile subscriber is a member of a defined group;
   allocating a group QoS profile to each group of subscribers;
   receiving from the requesting mobile subscriber, a request for a requested QoS profile;
   retrieving from a subscriber profile, a subscribed QoS profile for the requesting mobile subscriber in response to receiving the request; and
   allocating to the requesting mobile subscriber, an allowed QoS profile that is the lowest of the subscribed QoS profile, the group QoS profile for the requesting mobile subscriber's defined group, and the requested QoS profile.

10. The method according to claim 9, wherein the requesting mobile subscriber's defined group comprises mobile subscribers for whom the communication network is a home network.

11. The method according to claim 9, wherein the requesting mobile subscriber's defined group comprises mobile subscribers for whom the communication network is a visited network.

12. The method according to claim 9, wherein the requesting mobile subscriber's defined group comprises mobile subscribers who pay higher fees for better QoS.

13. The method according to claim 9, wherein the step of defining a plurality of groups includes considering a time and date indication when defining the groups of subscribers.

14. The method according to claim 9, wherein the step of defining a plurality of groups includes considering an Access Point Name (APN) when defining the groups of subscribers.

15. The method according to claim 9, wherein the group QoS profiles are defined on a per-operator basis.

16. The method according to claim 9, wherein the group QoS profiles are dynamically updated depending on resource availability in the communication network.

* * * * *

UNITED STATES PATENT AND TRADEMARK OFFICE
CERTIFICATE OF CORRECTION

| | | |
|---|---|---|
| PATENT NO. | : 7,916,691 B2 | Page 1 of 1 |
| APPLICATION NO. | : 11/576779 | |
| DATED | : March 29, 2011 | |
| INVENTOR(S) | : Kopplin | |

It is certified that error appears in the above-identified patent and that said Letters Patent is hereby corrected as shown below:

In Column 7, Line 19, delete "disadvantageous" and insert -- disadvantageous. --, therefor.

Signed and Sealed this
Sixth Day of September, 2011

David J. Kappos
*Director of the United States Patent and Trademark Office*